United States Patent
Umetani et al.

(10) Patent No.: US 10,235,893 B2
(45) Date of Patent: Mar. 19, 2019

(54) FLIGHT CONTROL METHOD AND UNMANNED UNMANNERED AERIAL VEHICLE

(71) Applicant: Panasonic Intellectual Property Corporation of America, Torrance, CA (US)

(72) Inventors: Hideo Umetani, Osaka (JP); Kazuma Takeuchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/479,341

(22) Filed: Apr. 5, 2017

(65) Prior Publication Data

US 2017/0330467 A1    Nov. 16, 2017

(30) Foreign Application Priority Data

May 11, 2016 (JP) .................................. 2016-095159
Dec. 22, 2016 (JP) .................................. 2016-248870

(51) Int. Cl.
| | | |
|---|---|---|
| G05D 1/04 | (2006.01) |
| G08G 5/04 | (2006.01) |
| B64C 39/02 | (2006.01) |
| B64D 47/08 | (2006.01) |

(Continued)

(52) U.S. Cl.
CPC .......... *G08G 5/045* (2013.01); *B64C 39/024* (2013.01); *B64D 47/08* (2013.01); *G01S 19/13* (2013.01);

(Continued)

(58) Field of Classification Search
CPC .................. G08G 5/045; B64C 39/024; B64C 2201/108; B64C 2201/127;

(Continued)

(56) References Cited

U.S. PATENT DOCUMENTS 5,321,489 A * 6/1994 Defour .................... G01S 7/481
                                                                    342/29
2002/0033769 A1 * 3/2002 Bass ......................... G01S 5/12
                                                                    342/418

(Continued)

FOREIGN PATENT DOCUMENTS

WO      2011/132291      10/2011

*Primary Examiner* — Hussein Elchanti
(74) *Attorney, Agent, or Firm* — Greenblum & Bernstein P.L.C.

(57) ABSTRACT

A method for controlling an aerial vehicle includes determining a direction in which the aerial vehicle is traveling; determining, with reference to a table, an altitude range which corresponds to the determined direction and within which the aerial vehicle is caused to fly, the table indicating correspondences between directions in which the aerial vehicle is traveling and altitude ranges within which the aerial vehicle is to fly; obtaining, from an altimeter, a first altitude, which is a current altitude, at which the aerial vehicle is flying; determining whether the first altitude is included in the determined altitude range; and if it is determined that the first altitude is not included in the determined altitude range, changing an altitude at which the aerial vehicle is caused to fly from the first altitude to a second altitude included in the determined altitude range.

20 Claims, 7 Drawing Sheets

(51) Int. Cl.
*G01S 19/13* (2010.01)
*G05D 1/10* (2006.01)
*G08G 5/00* (2006.01)

(52) U.S. Cl.
CPC ............. *G05D 1/042* (2013.01); *G05D 1/104* (2013.01); *G08G 5/006* (2013.01); *G08G 5/0021* (2013.01); *G08G 5/0052* (2013.01); *G08G 5/0069* (2013.01); *G08G 5/0078* (2013.01); *B64C 2201/108* (2013.01); *B64C 2201/127* (2013.01); *B64C 2201/145* (2013.01)

(58) Field of Classification Search
CPC ... B64C 2201/145; B64D 47/08; G01S 19/13; G05D 1/042
See application file for complete search history.

(56) References Cited

U.S. PATENT DOCUMENTS

| | | | |
|---|---|---|---|
| 2005/0230563 A1* | 10/2005 | Corcoran, III | B64C 13/20 244/175 |
| 2009/0257314 A1* | 10/2009 | Davis | G01S 5/18 367/125 |
| 2010/0100269 A1* | 4/2010 | Ekhaguere | G05D 1/101 701/26 |
| 2010/0238956 A1* | 9/2010 | Preuss | G01S 1/042 370/503 |
| 2011/0299732 A1* | 12/2011 | Jonchery | A63H 27/12 382/103 |
| 2013/0046459 A1 | 2/2013 | Itakura | |
| 2013/0179067 A1* | 7/2013 | Trowbridge | G01C 21/3484 701/410 |
| 2015/0302858 A1* | 10/2015 | Hearing | G10L 19/00 381/58 |
| 2016/0111006 A1* | 4/2016 | Srivastava | G08G 1/00 701/3 |
| 2016/0189549 A1* | 6/2016 | Marcus | G08G 5/0034 701/3 |
| 2017/0076616 A1* | 3/2017 | Kanade | G08G 5/045 |
| 2017/0148467 A1* | 5/2017 | Franklin | G10L 25/51 |
| 2017/0154535 A1* | 6/2017 | Downey | G08G 5/0039 |
| 2017/0162064 A1* | 6/2017 | Ubhi | G08G 5/0069 |
| 2017/0178518 A1* | 6/2017 | Foladare | G08G 5/0034 |
| 2017/0243494 A1* | 8/2017 | Taveira | G08G 5/006 |
| 2017/0267343 A1* | 9/2017 | Chen | B64C 39/024 |

* cited by examiner

| TRAVELING DIRECTION | FLIGHT ALTITUDE RANGE ||
|---|---|---|
| | LOWER-LIMIT FLIGHT ALTITUDE | UPPER-LIMIT FLIGHT ALTITUDE |
| NORTH | 141 m | 150 m |
| EAST | 131 m | 140 m |
| SOUTH | 121 m | 130 m |
| WEST | 111 m | 120 m |

FIG. 7 ved altitude range.

FLIGHT CONTROL METHOD AND UNMANNED UNMANNERED AERIAL VEHICLE

BACKGROUND

1. Technical Field

The present disclosure relates to a flight control method for controlling flight of an unmanned aerial vehicle and to an unmanned aerial vehicle.

2. Description of the Related Art

In recent years, compact unmanned aerial vehicles that fly autonomously have been developed, and inspection of infrastructure or transportation of goods by using unmanned aerial vehicles has been considered. Such an unmanned aerial vehicle is equipped with a plurality of propellers and is able to fly freely in the sky or autonomously along a predetermined flight route, with the rotation rate of each propeller being controlled.

When many unmanned aerial vehicles fly in the sky, the chance of a collision between unmanned aerial vehicles is increased. Thus, a technique for preventing a collision between unmanned aerial vehicles has been developed.

SUMMARY

However, the foregoing technique is susceptible to further improvement.

In one general aspect, the techniques disclosed here feature a method for controlling a aerial vehicle. The method includes determining a direction in which the aerial vehicle is traveling; determining, with reference to a table, an altitude range which corresponds to the determined direction and within which the aerial vehicle is caused to fly, the table indicating correspondences between directions in which the aerial vehicle is traveling and altitude ranges within which the aerial vehicle is to fly; obtaining, from an altimeter included in the aerial vehicle, a first altitude, which is a current altitude, at which the aerial vehicle is flying; determining whether the first altitude is included in the determined altitude range; and if it is determined that the first altitude is not included in the determined altitude range, changing an altitude at which the aerial vehicle is caused to fly from the first altitude to a second altitude included in the determined altitude range.

These general and specific aspects may be implemented using a system, a method, and a computer program, and any combination of systems, methods, and computer programs.

According to an embodiment of the present disclosure, the risk of collision between unmanned aerial vehicles may further be reduced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

As described above, when many unmanned aerial vehicles fly in the sky, the chance of a collision between unmanned aerial vehicles is increased. Thus, a technique for preventing a collision between unmanned aerial vehicles has been developed.

For example, International Publication No. WO/2011/132291 discloses a flight condition control device including a prediction unit that predicts the risk of collision of a aerial vehicle by using at least altitude, body speed, and body position as parameters, and a flight condition control unit that controls the flight condition of the aerial vehicle by controlling the body speed, body position, and flight route if the prediction unit determines that the risk of collision is high.

The aerial vehicle according to the above-mentioned publication is able to fly freely in the sky. When many aerial vehicles fly in the sky, the chance of a collision between aerial vehicles is increased. Also, in the flight condition control device according to the above-mentioned publication, it is necessary to predict collision in all directions around the aerial vehicles, and thus the amount of data to be obtained and processed is very large.

Furthermore, the flight condition control device according to the related art uses a plurality of pieces of data to predict collision. Thus, in the aerial vehicle according to the related art, it is necessary to provide a plurality of sensors to obtain the plurality of pieces of data, which increases the manufacturing cost of the aerial vehicle.

Accordingly, the inventor of the present disclosure considered the following measures.

A method according to an aspect of the present disclosure is a method for controlling a aerial vehicle, including determining a direction in which the aerial vehicle is traveling; determining, with reference to a table, an altitude range which corresponds to the determined direction and within which the aerial vehicle is caused to fly, the table indicating correspondences between directions in which the aerial vehicle is traveling and altitude ranges within which the aerial vehicle is to fly; obtaining, from an altimeter included in the aerial vehicle, a first altitude, which is a current altitude, at which the aerial vehicle is flying; determining whether the first altitude is included in the determined altitude range; and if it is determined that the first altitude is not included in the determined altitude range, changing an altitude at which the aerial vehicle is caused to fly from the first altitude to a second altitude included in the determined altitude range.

With this configuration, aerial vehicles that are travelling in different directions fly at different altitudes, and thus the risk of collision between the aerial vehicles can further be reduced.

In the foregoing aspect, the method may further include obtaining, from a Global Positioning System (GPS), position information representing a position of the aerial vehicle; and determining, based on the position information, the direction in which the aerial vehicle is traveling.

In the foregoing aspect, the determining the direction in which the aerial vehicle is traveling may include obtaining a detection result from a magnetic sensor included in the aerial vehicle.

In the foregoing aspect, the determining the direction in which the aerial vehicle is traveling may include obtaining a detection result from a positioning sensor included in the aerial vehicle.

In the foregoing aspect, the table may be stored in a memory included in the aerial vehicle.

In the foregoing aspect, the table may be stored in a server connected to the aerial vehicle through a network.

In the foregoing aspect, the method may further include obtaining a detection result from a sensor included in the aerial vehicle, the detection result indicating whether an obstacle in the determined altitude range is present in front of the aerial vehicle that is traveling; and if the detection result indicates that the obstacle is present, causing the aerial vehicle to fly in a direction to avoid collision with the obstacle within the determined altitude range.

With this configuration, whether or not the aerial vehicle will collide with an obstacle such as another aerial vehicle is predicted. If it is predicted that the aerial vehicle will collide with an obstacle, the flight of the unmanned aerial vehicle is controlled so that the aerial vehicle flies in a direction to avoid collision with the obstacle within a flight altitude range that is determined in accordance with a traveling direction. Thus, collision with an obstacle in front of the aerial vehicle in the traveling direction can be prevented more reliably.

In the foregoing aspect, the sensor may include any one of a laser sensor, an ultrasonic sensor, and a camera.

In the foregoing aspect, the determined altitude range may be from a third altitude to a fourth altitude higher than the third altitude, and the method may further include obtaining a detection result from a sensor included in the aerial vehicle, the detection result indicating whether an obstacle in the determined altitude range is present in front of the aerial vehicle that is traveling; and if the detection result indicates that an obstacle is present within a range from a fifth altitude to a sixth altitude higher than the fifth altitude, changing the altitude at which the aerial vehicle is caused to fly to a seventh altitude included in a range from the third altitude to the fifth altitude or a range from the sixth altitude to the fourth altitude.

With this configuration, whether or not the aerial vehicle will collide with an obstacle such as another aerial vehicle is predicted. If it is predicted that the aerial vehicle will collide with an obstacle, the flight of the aerial vehicle is controlled so that the aerial vehicle flies to avoid collision with the obstacle within a flight altitude range that is determined in accordance with a traveling direction. Thus, collision with an obstacle in front of the aerial vehicle in the traveling direction can be prevented more reliably.

In the foregoing aspect, the sensor may include any one of a laser sensor, an ultrasonic sensor, and a camera.

In the foregoing aspect, the method may further include obtaining a detection result from a sensor included in the aerial vehicle, the detection result indicating whether an obstacle in the determined altitude range is present in front of the aerial vehicle that is traveling; and causing the aerial vehicle to fly along a route different from a route along which the aerial vehicle is traveling, with an altitude of the aerial vehicle being maintained, at least until the aerial vehicle has passed the obstacle, the obstacle not being present on the different route.

With this configuration, whether or not the aerial vehicle will collide with an obstacle such as another aerial vehicle is predicted. If it is predicted that the aerial vehicle will collide with an obstacle, the flight of the aerial vehicle is controlled so that the aerial vehicle flies to avoid collision with the obstacle within a flight altitude range that is determined in accordance with a traveling direction. Thus, collision with an obstacle in front of the aerial vehicle in the traveling direction can be prevented more reliably.

In the foregoing aspect, the sensor may include any one of a laser sensor, an ultrasonic sensor, and a camera.

In the foregoing aspect, the table may indicate a correspondence between a first direction and a first altitude range, a correspondence between a second direction and a second altitude range, a correspondence between a third direction and a third altitude range, and a correspondence between a fourth direction and a fourth altitude range; the first direction may indicate a direction included in a continuous direction range from northwest to northeast, north being included in the first direction; the second direction may indicate a direction included in a continuous direction range from northeast to southeast, east being included in the second direction; the third direction may indicate a direction included in a continuous direction range from southeast to southwest, south being included in the third direction; the fourth direction may indicate a direction included in a continuous direction range from southwest to northwest, west being included in the fourth direction; and the first altitude range, the second altitude range, the third altitude range, and the fourth altitude range may be different from one another.

With this configuration, the altitude range of the aerial vehicle can be determined to be one of the first to fourth altitude ranges in accordance with a traveling direction of the aerial vehicle.

In the foregoing aspect, the altitude ranges indicated in the table may include a first altitude range and a second altitude range higher than the first altitude range, and the method may further include obtaining weight information of the aerial vehicle from a memory included in the aerial vehicle; if it is determined based on the weight information that a weight of the aerial vehicle is lower than or equal to a predetermined value, determining, from the first altitude range, the altitude range within which the aerial vehicle is caused to fly; and if it is determined based on the weight information that the weight of the aerial vehicle is higher than the predetermined value, determining, from the second altitude range, the altitude range within which the aerial vehicle is caused to fly.

With this configuration, the aerial vehicle flies low when the weight of the aerial vehicle is low, and thus the aerial vehicle is insusceptible to wind and is able to fly efficiently.

In the foregoing aspect, the altitude ranges indicated in the table may include a first altitude range and a second altitude range higher than the first altitude range, and the method may further include, if the aerial vehicle is not transporting a load, determining, from the first altitude range, the altitude range within which the aerial vehicle is caused to fly; and if the aerial vehicle is transporting a load, determining, from the second altitude range, the altitude range within which the aerial vehicle is caused to fly.

With this configuration, the aerial vehicle flies low when the aerial vehicle is not transporting a load, and thus the aerial vehicle is insusceptible to wind and is able to fly efficiently.

In the foregoing aspect, the altitude ranges indicated in the table may include a first altitude range and a second altitude range higher than the first altitude range, and the method may further include obtaining, from a Global Positioning System (GPS), position information representing a position of the aerial vehicle; obtaining, based on the obtained position information, map information including a position of the aerial vehicle, the map information including information representing positions and heights of structures around the position of the aerial vehicle; if a building within a predetermined range from the position of the aerial vehicle has a height lower than the first altitude range, determining, from the first altitude range, the altitude range within which the aerial vehicle is caused to fly; and if the building within the predetermined range from the position of the aerial vehicle has a height higher than the first altitude range and lower than the second altitude range, determining, from the second altitude range, the altitude range within which the aerial vehicle is caused to fly.

With this configuration, the altitude range is changed in accordance with the height of a structure around the current position of the aerial vehicle. Thus, the risk of collision with a structure is reduced and a safer flight is realized.

A aerial vehicle according to another aspect of the present disclosure is a aerial vehicle that flies in an unmanned manner, including a processor and a memory. The processor determines a direction in which the aerial vehicle is traveling, determines, with reference to a table stored in the memory, an altitude range which corresponds to the determined direction and within which the aerial vehicle is caused to fly, the table indicating correspondences between directions in which the aerial vehicle is traveling and altitude ranges within which the aerial vehicle is to fly, obtains, from an altimeter included in the aerial vehicle, a first altitude, which is a current altitude, at which the aerial vehicle is flying, determines whether the first altitude is included in the determined altitude range, and if it is determined that the first altitude is not included in the determined altitude range, changes an altitude at which the aerial vehicle is caused to fly from the first altitude to a second altitude included in the determined altitude range.

With this configuration, aerial vehicles that are travelling in different directions fly at different altitudes, and thus the risk of collision between the aerial vehicles can further be reduced.

Hereinafter, embodiments of the present disclosure will be described with reference to the attached drawings. Note that the following embodiments are examples in which the present disclosure is embodied, and do not limit the technical scope of the present disclosure.

First Embodiment

Figure 1:
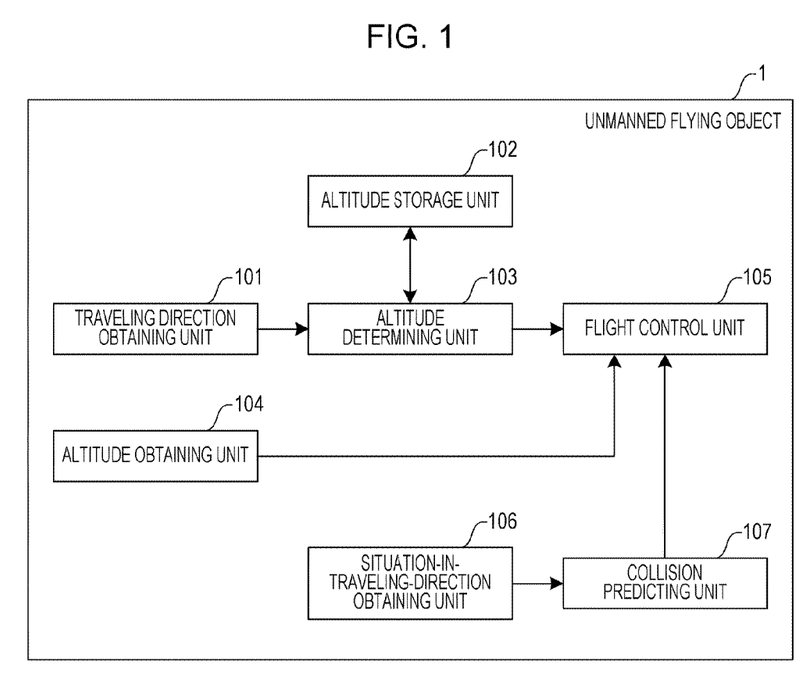
FIG. 1 is a diagram illustrating the configuration of an unmanned aerial vehicle according to a first embodiment of the present disclosure.

FIG. 1 is a diagram illustrating the configuration of an unmanned aerial vehicle according to a first embodiment of the present disclosure.

An unmanned aerial vehicle 1 flies autonomously in accordance with a flight route generated in advance. The unmanned aerial vehicle 1 is equipped with a plurality of propellers and moves forward, backward, leftward, rightward, upward, and downward, with the rotation rate of each propeller being controlled. The unmanned aerial vehicle 1 flies autonomously along a flight route generated in advance while obtaining its current position by using the Global Positioning System (GPS), which is not illustrated. The flight route is generated by a flight route generation apparatus, for example, a smartphone, a tablet computer, or a personal computer. The unmanned aerial vehicle 1 receives the flight route generated by the flight route generation apparatus.

The unmanned aerial vehicle 1 illustrated in FIG. 1 includes a traveling direction obtaining unit 101, an altitude storage unit 102, an altitude determining unit 103, an altitude obtaining unit 104, a flight control unit 105, a situation-in-traveling-direction obtaining unit 106, and a collision predicting unit 107.

The traveling direction obtaining unit 101 obtains a traveling direction of the unmanned aerial vehicle 1. The traveling direction obtaining unit 101 measures two different positions by using the GPS (not illustrated) and thereby calculates a traveling direction of the unmanned aerial vehicle 1. The traveling direction obtaining unit 101 may obtain a traveling direction of the unmanned aerial vehicle 1 by using various types of sensors, such as an acceleration sensor, a geomagnetic sensor (electronic compass), or a positioning sensor. Alternatively, the traveling direction obtaining unit 101 may obtain a traveling direction of the unmanned aerial vehicle 1 by using route information representing a route from a current position to a destination. The route information may be stored in advance or may be received from the outside. The traveling direction is represented by, for example, an angle (azimuth angle) with respect to the direction of north. That is, the direction of north is denoted as 0 degrees, the direction of east is denoted as 90 degrees, the direction of south is denoted as 180 degrees, and the direction of west is denoted as 270 degrees.

The altitude storage unit 102 stores a plurality of traveling directions of the unmanned aerial vehicle 1 and a plurality of flight altitude ranges of the unmanned aerial vehicle 1 in association with each other. The altitude storage unit 102 stores a table in which the plurality of traveling directions, lower-limit flight altitudes representing the lowest flight altitudes at which the unmanned aerial vehicle 1 is able to fly in the plurality of flight altitude ranges, and upper-limit flight altitudes representing the highest flight altitudes at which the unmanned aerial vehicle 1 is able to fly in the plurality of flight altitude ranges are associated with one another.

Figure 2:
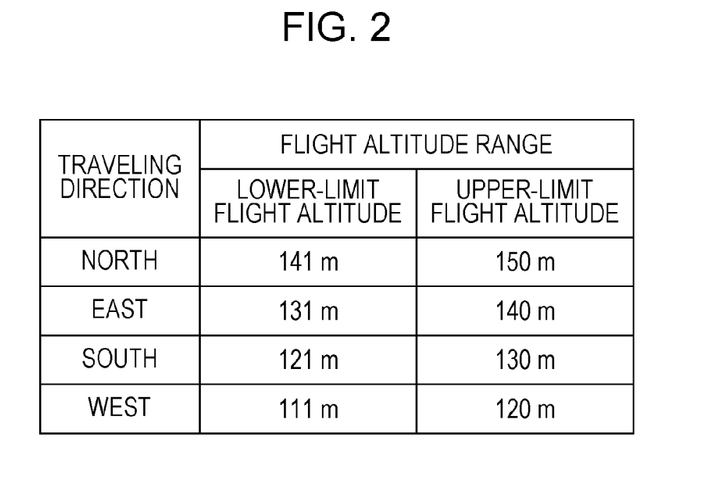
FIG. 2 is a diagram illustrating an example of a table stored in an altitude storage unit according to the first embodiment.

FIG. 2 is a diagram illustrating an example of the table stored in the altitude storage unit 102 according to the first embodiment.

As illustrated in FIG. 2, the altitude storage unit 102 stores the plurality of traveling directions of the unmanned aerial vehicle 1 and the plurality of flight altitude ranges of the unmanned aerial vehicle 1 in association with each other. Each flight altitude range includes a lower-limit flight altitude and an upper-limit flight altitude. For example, a traveling direction of north is associated with a lower-limit flight altitude of 141 m and an upper-limit flight altitude of 150 m; a traveling direction of east is associated with a lower-limit flight altitude of 131 m and an upper-limit flight altitude of 140 m; a traveling direction of south is associated with a lower-limit flight altitude of 121 m and an upper-limit flight altitude of 130 m; and a traveling direction of west is associated with a lower-limit flight altitude of 111 m and an upper-limit flight altitude of 120 m.

A traveling direction of the unmanned aerial vehicle 1 is classified as any one of north, east, south, and west. If an actual traveling direction is within an angle between the direction of northwest and the direction of northeast, the traveling direction is classified as north. If an actual traveling direction is within an angle between the direction of northeast and the direction of southeast, the traveling direction is classified as east. If an actual traveling direction is within an angle between the direction of southeast and the direction of southwest, the traveling direction is classified as south. If an actual traveling direction is within an angle between the direction of southwest and the direction of northwest, the traveling direction is classified as west. If an actual traveling direction is the direction of northeast, the traveling direction is classified as either north or east. If an actual traveling direction is the direction of southeast, the traveling direction is classified as either south or east. If an actual traveling direction is the direction of southwest, the traveling direction is classified as either south or west. If an actual traveling direction is the direction of northwest, the traveling direction is classified as either north or west.

The lower-limit flight altitudes and the upper-limit flight altitudes illustrated in FIG. 2 are examples and the values thereof are not limited thereto.

The altitude determining unit 103 determines a flight altitude range corresponding to the traveling direction obtained by the traveling direction obtaining unit 101 from among the plurality of flight altitude ranges, on the basis of information representing the correspondence between the plurality of traveling directions and the plurality of flight altitude ranges that include different altitudes and that do not overlap with one another. The altitude determining unit 103 determines a lower-limit flight altitude and an upper-limit flight altitude corresponding to the traveling direction obtained by the traveling direction obtaining unit 101 with reference to the table in which the plurality of traveling directions, lower-limit flight altitudes representing the lowest flight altitudes at which the unmanned aerial vehicle 1 is able to fly in the plurality of flight altitude ranges, and upper-limit flight altitudes representing the highest flight altitudes at which the unmanned aerial vehicle 1 is able to fly in the plurality of flight altitude ranges are associated with one another.

If the traveling direction is within an angle between the direction of northwest and the direction of northeast, the altitude determining unit 103 determines the flight altitude range to be a first flight altitude range. If the traveling direction is within an angle between the direction of northeast and the direction of southeast, the altitude determining unit 103 determines the flight altitude range to be a second flight altitude range that includes altitudes different from those in the first flight altitude range. If the traveling direction is within an angles between the direction of southeast and the direction of southwest, the altitude determining unit 103 determines the flight altitude range to be a third flight altitude range that includes altitudes different from those in the first and second flight altitude ranges. If the traveling direction is within an angle between the direction of southwest and the direction of northwest, the altitude determining unit 103 determines the flight altitude range to be a fourth flight altitude range that includes altitudes different from those in the first, second, and third flight altitude ranges.

The altitude obtaining unit 104 obtains a current flight altitude of the unmanned aerial vehicle 1. The altitude obtaining unit 104 obtains, as a current flight altitude of the unmanned aerial vehicle 1, an altitude measured by an altimeter (not illustrated). The altitude obtaining unit 104 may obtain, as a current flight altitude of the unmanned aerial vehicle 1, an altitude measured by the GPS (not illustrated). The GPS is able to obtain an altitude in addition to a latitude and a longitude and functions as an altimeter. Thus, the GPS is included in a kind of altimeter.

If the current flight altitude obtained by the altitude obtaining unit 104 is not included in the flight altitude range determined by the altitude determining unit 103, the flight control unit 105 controls the flight of the unmanned aerial vehicle 1 so that the unmanned aerial vehicle 1 flies within the determined flight altitude range. For example, the flight control unit 105 controls the flight of the unmanned aerial vehicle 1 so that the unmanned aerial vehicle 1 flies at a flight altitude between the upper-limit flight altitude and the lower-limit flight altitude.

Figure 3:
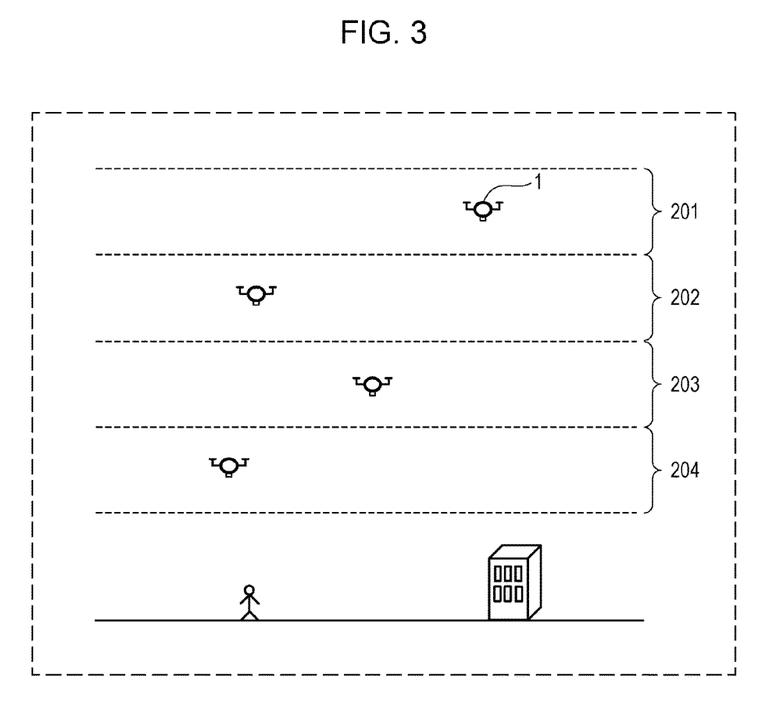
FIG. 3 is a schematic diagram for describing flight altitude ranges according to the first embodiment.

FIG. 3 is a schematic diagram for describing the flight altitude ranges according to the first embodiment. Referring to FIG. 3, if the traveling direction is within an angle between the direction of northwest and the direction of northeast, the altitude determining unit 103 determines the flight altitude range to be a first flight altitude range 201. If the traveling direction is within an angle between the direction of northeast and the direction of southeast, the altitude determining unit 103 determines the flight altitude range to be a second flight altitude range 202. If the traveling direction is within an angle between the direction of southeast and the direction of southwest, the altitude determining unit 103 determines the flight altitude range to be a third flight altitude range 203. If the traveling direction is within an angle between the direction of southwest and the direction of northwest, the altitude determining unit 103 determines the flight altitude range to be a fourth flight altitude range 204.

The lower-limit flight altitude of the first flight altitude range 201 may be equal to the upper-limit flight altitude of the second flight altitude range 202. When the unmanned aerial vehicle 1 flies within the first flight altitude range 201, the unmanned aerial vehicle 1 flies above the lower-limit flight altitude of the first flight altitude range 201. When the unmanned aerial vehicle 1 flies within the second flight altitude range 202, the unmanned aerial vehicle 1 flies below the upper-limit flight altitude of the second flight altitude range 202.

Likewise, the lower-limit flight altitude of the second flight altitude range 202 may be equal to the upper-limit flight altitude of the third flight altitude range 203, and the lower-limit flight altitude of the third flight altitude range 203 may be equal to the upper-limit flight altitude of the fourth flight altitude range 204.

A plurality of unmanned aerial vehicles 1 preferably fly at the same speed. Accordingly, a situation can be prevented from occurring where a certain unmanned aerial vehicle 1 collides with another unmanned aerial vehicle 1 that flies ahead of the certain unmanned aerial vehicle 1 at a speed lower than that of the certain unmanned aerial vehicle 1.

The situation-in-traveling-direction obtaining unit 106 obtains a situation in the traveling direction of the unmanned aerial vehicle 1. For example, the situation-in-traveling-direction obtaining unit 106 emits laser light in the traveling direction of the unmanned aerial vehicle 1, receives laser light reflected by an obstacle, and thereby detects the obstacle that is present in the traveling direction of the unmanned aerial vehicle 1 and also detects the distance to the obstacle. The situation-in-traveling-direction obtaining unit 106 may detect an obstacle that is present in the traveling direction of the unmanned aerial vehicle 1 by using an ultrasonic sensor. Alternatively, the situation-in-traveling-direction obtaining unit 106 may detect an obstacle that is present in the traveling direction of the unmanned aerial vehicle 1 by obtaining an image of a region in the traveling direction of the unmanned aerial vehicle 1 from a camera and analyzing the obtained image. The situation-in-traveling-direction obtaining unit 106 may use various types of sensors as long as the sensors are able to detect an object that is present in the traveling direction of the unmanned aerial vehicle 1. For example, the situation-in-traveling-direction obtaining unit 106 may detect an obstacle that is present in the traveling direction of the unmanned aerial vehicle 1 in real time by using a millimeter wave sensor, an infrared sensor, light detection and ranging (LIDAR), or the GPS. Furthermore, the situation-in-traveling-direction obtaining unit 106 may detect an obstacle that is present in the traveling direction of the unmanned aerial vehicle 1 by using route information representing a route from a current position to a destination. The route information may be stored in advance or may be received from the outside.

The collision predicting unit 107 predicts, on the basis of a situation in a traveling direction obtained by the situation-in-traveling-direction obtaining unit 106, whether or not the unmanned aerial vehicle 1 will collide with an obstacle. If an obstacle is detected in the traveling direction of the unmanned aerial vehicle 1, the collision predicting unit 107 predicts that the unmanned aerial vehicle 1 will collide with the obstacle. If the distance between an obstacle that is present in the traveling direction of the unmanned aerial vehicle 1 and the unmanned aerial vehicle 1 is shorter than or equal to a predetermined distance, the collision predicting unit 107 may predict that the unmanned aerial vehicle 1 will collide with the obstacle. Alternatively, the collision predicting unit 107 may obtain, at a predetermined time interval, the distance between an obstacle that is present in the traveling direction of the unmanned aerial vehicle 1 and the unmanned aerial vehicle 1, and if the unmanned aerial vehicle 1 is approaching the obstacle, the collision predicting unit 107 may predict that the unmanned aerial vehicle 1 will collide with the obstacle.

If the collision predicting unit 107 predicts that the unmanned aerial vehicle 1 will collide with an obstacle, the flight control unit 105 controls the flight of the unmanned aerial vehicle 1 so that the unmanned aerial vehicle 1 flies in a direction to avoid collision with the obstacle within a flight altitude range determined in accordance with the traveling direction. For example, if the collision predicting unit 107 predicts that the unmanned aerial vehicle 1 will collide with an obstacle, the flight control unit 105 controls the flight of the unmanned aerial vehicle 1 so that the unmanned aerial vehicle 1 flies above or below the obstacle within a flight altitude range determined in accordance with the traveling direction. For example, if the collision predicting unit 107 predicts that the unmanned aerial vehicle 1 will collide with an obstacle, the flight control unit 105 controls the unmanned aerial vehicle 1 so that the unmanned aerial vehicle 1 flies by changing the route to avoid the obstacle at least until the unmanned aerial vehicle 1 has passed the obstacle while maintaining the altitude.

Preferably, the situation-in-traveling-direction obtaining unit 106 obtains a situation only in the traveling direction of the unmanned aerial vehicle 1. That is, since a flight altitude range is determined in accordance with the traveling direction of each unmanned aerial vehicle 1, unmanned aerial vehicles 1 flying within the same flight altitude range move in the same direction. Thus, by detecting a structure that is present in the traveling direction of the unmanned aerial vehicle 1 or another unmanned aerial vehicle 1 flying ahead in the traveling direction at a different speed, collision with the structure or the other unmanned aerial vehicle 1 can be prevented more reliably.

In the first embodiment, it is sufficient to obtain a situation only in the traveling direction of the unmanned aerial vehicle 1. Thus, the number of sensors provided in the unmanned aerial vehicle 1 can be reduced compared to an unmanned aerial vehicle according to the related art, and the manufacturing cost of the unmanned aerial vehicle 1 can be reduced.

Next, a description will be given of an operation of the unmanned aerial vehicle 1 according to the first embodiment.

Figure 4:
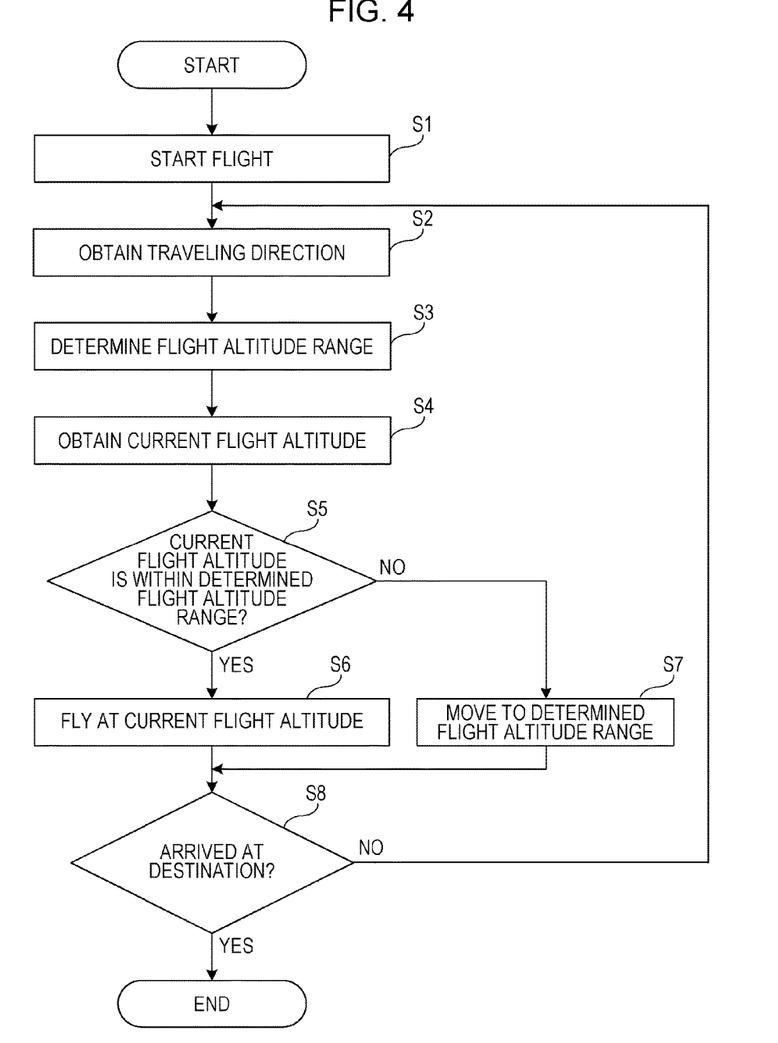
FIG. 4 is a flowchart for describing the operation of the unmanned aerial vehicle according to the first embodiment.

FIG. 4 is a flowchart for describing the operation of the unmanned aerial vehicle 1 according to the first embodiment.

First, in step S1, the flight control unit 105 starts flight of the unmanned aerial vehicle 1. At this time, the flight control unit 105 causes the unmanned aerial vehicle 1 to fly along a flight route from a current position (starting point) to a destination.

Subsequently, in step S2, the traveling direction obtaining unit 101 obtains a traveling direction of the unmanned aerial vehicle 1.

Subsequently, in step S3, the altitude determining unit 103 determines a flight altitude range corresponding to the traveling direction obtained by the traveling direction obtaining unit 101 from among a plurality of flight altitude ranges, on the basis of information in which a plurality of traveling directions are associated with the plurality of flight altitude ranges that include different altitudes and that do not overlap with one another.

Subsequently, in step S4, the altitude obtaining unit 104 obtains a current flight altitude of the unmanned aerial vehicle 1.

Subsequently, in step S5, the flight control unit 105 determines whether or not the current flight altitude obtained by the altitude obtaining unit 104 is within the flight altitude range determined by the altitude determining unit 103. If it is determined that the current flight altitude is within the determined flight altitude range (YES in step S5), the flight control unit 105 controls the flight of the unmanned aerial vehicle 1 so that the unmanned aerial vehicle 1 maintains the current flight altitude in step S6.

On the other hand, if it is determined that the current flight altitude is not within the determined flight altitude range (NO in step S5), the flight control unit 105 controls the flight of the unmanned aerial vehicle 1 so that the unmanned aerial vehicle 1 moves to the determined flight altitude range in step S7.

Subsequently, in step S8, the flight control unit 105 determines whether or not the unmanned aerial vehicle 1 has arrived at the destination. If the current position of the unmanned aerial vehicle 1 obtained from the GPS or the like matches the position of the destination, the flight control unit 105 determines that the unmanned aerial vehicle 1 has arrived at the destination. If it is determined that the unmanned aerial vehicle 1 has arrived at the destination (YES in step S8), the process ends. On the other hand, if it is determined that the unmanned aerial vehicle 1 has not arrived at the destination (NO in step S8), the process returns to step S2.

In the first embodiment, the flight control unit 105 may obtain a current position of the unmanned aerial vehicle 1 by using the GPS or the like and may obtain map information representing the surroundings of the unmanned aerial vehicle 1 on the basis of the obtained current position. The flight control unit 105 may control the flight of the unmanned aerial vehicle 1 on the basis of the obtained map information so that the unmanned aerial vehicle 1 flies above a road. The map information may be obtained from a server through a network or may be stored in the unmanned aerial vehicle 1 in advance.

In the first embodiment, a flight altitude range is associated with each of four traveling directions of north, east, south, and west. The present disclosure is not limited thereto, and a flight altitude range may be associated with each of eight traveling directions of north, east, south, west, northeast, southeast, southwest, and northwest.

The unmanned aerial vehicle 1 may obtain, from a server, limited-flight-altitude region information representing a limited-flight-altitude region where the flight altitude is limited. In the case of flying within the limited-flight-altitude region, the altitude determining unit 103 may divide limited flight altitudes into a plurality of flight altitude ranges and may determine a flight altitude range corresponding to the obtained traveling direction from among the plurality of flight altitude ranges.

In the first embodiment, the unmanned aerial vehicle 1 may obtain, from the server, flight prohibited region information representing a flight prohibited region where flight is prohibited. In this case, the flight control unit 105 may control the flight of the unmanned aerial vehicle 1 so that the unmanned aerial vehicle 1 does not fly within the flight prohibited region.

The unmanned aerial vehicle 1 according to the first embodiment flies autonomously on the basis of a flight route generated in advance. The present disclosure is not particularly limited thereto, and the unmanned aerial vehicle 1 may be remotely controlled by a user with a remote control.

In the first embodiment, the traveling direction obtaining unit 101, the altitude storage unit 102, the altitude determining unit 103, the altitude obtaining unit 104, the situation-in-traveling-direction obtaining unit 106, and the collision predicting unit 107 may be included in a server that is connected to the unmanned aerial vehicle 1 through a network such that the unmanned aerial vehicle 1 is able to communicate with the server. In this case, the unmanned aerial vehicle 1 may transmit information representing a current position, altitude, and situation in the traveling direction that are measured by sensors to the server. The server may transmit information representing a flight altitude range within which the unmanned aerial vehicle 1 flies to the unmanned aerial vehicle 1. The unmanned aerial vehicle 1 may fly on the basis of the information representing the flight altitude range received from the server.

In the first embodiment, a flight altitude range corresponding to an obtained traveling direction is determined from among a plurality of flight altitude ranges that include different altitudes and that do not overlap with one another. The present disclosure is not particularly limited thereto. A flight control method for controlling flight of an unmanned aerial vehicle may include obtaining a traveling direction of an unmanned aerial vehicle, determining a flight altitude corresponding to the obtained traveling direction from among a plurality of flight altitudes that are different from one another and that do not overlap with one another, obtaining a current flight altitude of the unmanned aerial vehicle, and if the obtained flight altitude does not match the determined flight altitude, controlling flight of the unmanned aerial vehicle so that the unmanned aerial vehicle flies at the determined flight altitude.

Second Embodiment

Next, a description will be given of an unmanned aerial vehicle according to a second embodiment of the present disclosure. An unmanned aerial vehicle is susceptible to wind when the weight of its body is low. Accordingly, in the second embodiment, a flight altitude range is changed in accordance with the weight of an unmanned aerial vehicle.

Figure 5:
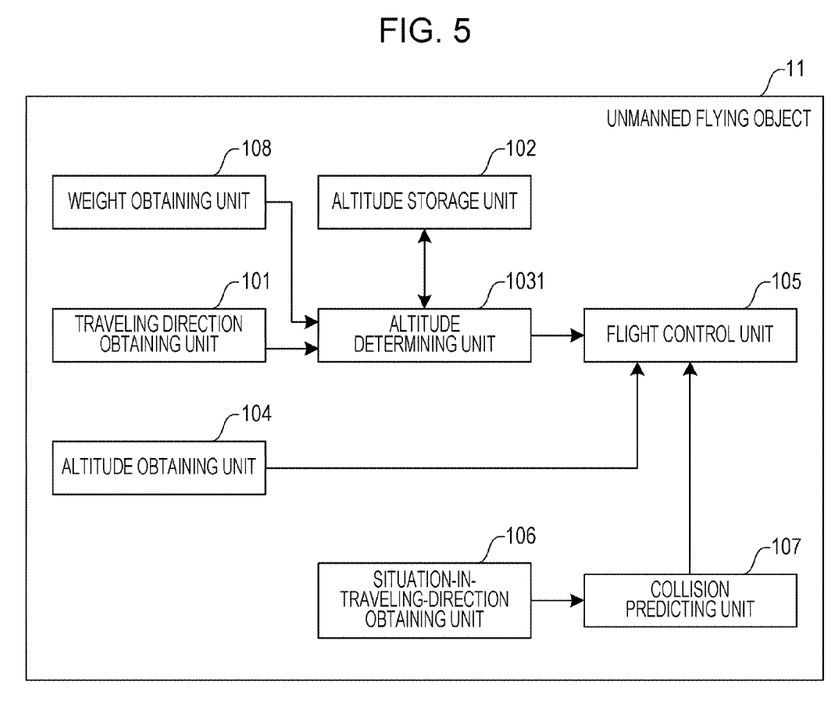
FIG. 5 is a diagram illustrating the configuration of an unmanned aerial vehicle according to a second embodiment of the present disclosure.

FIG. 5 is a diagram illustrating the configuration of an unmanned aerial vehicle according to the second embodiment of the present disclosure. The unmanned aerial vehicle 11 illustrated in FIG. 5 includes a traveling direction obtaining unit 101, an altitude storage unit 102, an altitude obtaining unit 104, a flight control unit 105, a situation-in-traveling-direction obtaining unit 106, a collision predicting unit 107, a weight obtaining unit 108, and an altitude determining unit 1031. In the unmanned aerial vehicle 11 according to the second embodiment, the same components as those in the unmanned aerial vehicle 1 according to the first embodiment are denoted by the same reference numerals and the description thereof is omitted.

The weight obtaining unit 108 obtains a weight of the unmanned aerial vehicle 11. The weight obtaining unit 108 obtains a weight of the unmanned aerial vehicle 11 stored in a memory (not illustrated). The weight of the unmanned aerial vehicle 11 is measured, for example, before flight starts, and is stored in the memory (not illustrated) included in the unmanned aerial vehicle 11.

The altitude determining unit 1031 determines a flight altitude range corresponding to the traveling direction obtained by the traveling direction obtaining unit 101 from among a first plurality of flight altitude ranges if the weight of the unmanned aerial vehicle 11 is lower than or equal to a predetermined weight.

The altitude determining unit 1031 determines a flight altitude range corresponding to the traveling direction obtained by the traveling direction obtaining unit 101 from among a second plurality of flight altitude ranges if the weight of the unmanned aerial vehicle 11 is higher than the predetermined weight. The flight altitudes included in the second plurality of flight altitude ranges are higher than those included in the first plurality of flight altitude ranges.

Figure 6:
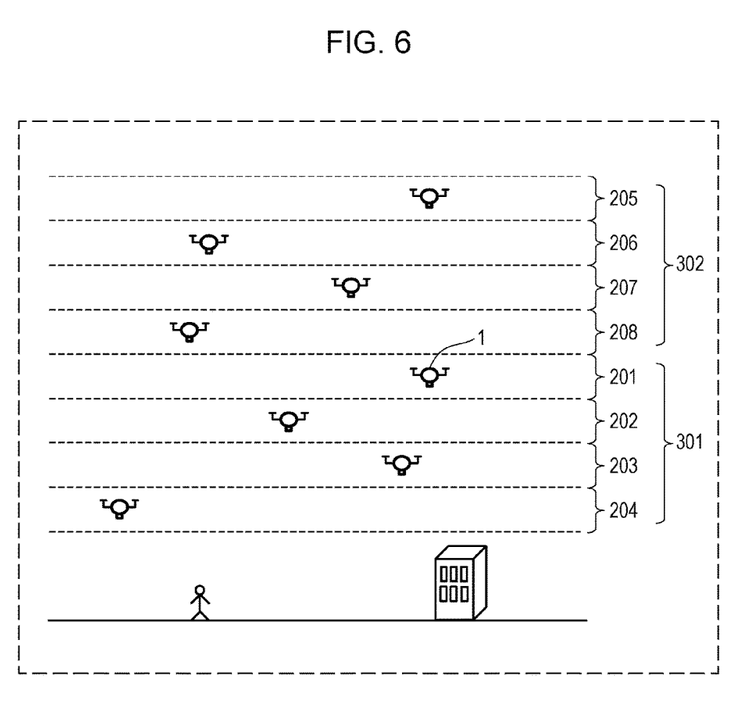
FIG. 6 is a schematic diagram for describing flight altitude ranges according to the second embodiment.

FIG. 6 is a schematic diagram for describing flight altitude ranges according to the second embodiment. As illustrated in FIG. 6, if the weight of the unmanned aerial vehicle 11 is lower than or equal to a predetermined weight, the altitude determining unit 1031 determines a flight altitude range corresponding to the traveling direction of the unmanned aerial vehicle 11 from among a first plurality of flight altitude ranges 301. If the weight of the unmanned aerial vehicle 11 is lower than or equal to the predetermined weight and if the traveling direction is within an angle between the direction of northwest and the direction of northeast, the altitude determining unit 1031 determines the flight altitude range to be a first flight altitude range 201. If the weight of the unmanned aerial vehicle 11 is lower than or equal to the predetermined weight and if the traveling direction is within an angle between the direction of northeast and the direction of southeast, the altitude determining unit 1031 determines the flight altitude range to be a second flight altitude range 202. If the weight of the unmanned aerial vehicle 11 is lower than or equal to the predetermined weight and if the traveling direction is within an angle between the direction of southeast and the direction of southwest, the altitude determining unit 1031 determines the flight altitude range to be a third flight altitude range 203. If the weight of the unmanned aerial vehicle 11 is lower than or equal to the predetermined weight and if the traveling direction is within an angle between the direction of southwest and the direction of northwest, the altitude determining unit 1031 determines the flight altitude range to be a fourth flight altitude range 204.

If the weight of the unmanned aerial vehicle 11 is higher than the predetermined weight, the altitude determining unit 1031 determines a flight altitude range corresponding to the traveling direction of the unmanned aerial vehicle 11 from among a second plurality of flight altitude ranges 302. If the weight of the unmanned aerial vehicle 11 is higher than the predetermined weight and if the traveling direction is within an angle between the direction of northwest and the direction of northeast, the altitude determining unit 1031 determines the flight altitude range to be a fifth flight altitude range 205. If the weight of the unmanned aerial vehicle 11 is higher than the predetermined weight and if the traveling direction is within an angle between the direction of northeast and the direction of southeast, the altitude determining unit 1031 determines the flight altitude range to be a sixth flight altitude range 206. If the weight of the unmanned aerial vehicle 11 is higher than the predetermined weight and if the traveling direction is within an angle between the direction of southeast and the direction of southwest, the altitude determining unit 1031 determines the flight altitude range to be a seventh flight altitude range 207. If the weight of the unmanned aerial vehicle 11 is higher than the predetermined weight and if the traveling direction is within an angle between the direction of southwest and the direction of northwest, the altitude determining unit 1031 determines the flight altitude range to be an eighth flight altitude range 208.

In this way, the unmanned aerial vehicle 11 flies low when the weight thereof is low. Thus, the unmanned aerial vehicle 11 is insusceptible to wind and is able to fly efficiently.

In the second embodiment, the altitude determining unit 1031 changes a flight altitude range in accordance with the weight of the unmanned aerial vehicle 11. The present disclosure is not limited thereto, and a flight altitude range may be changed in accordance with the size of the unmanned aerial vehicle 11. That is, if the size of the unmanned aerial vehicle 11 is smaller than or equal to a predetermined size, the altitude determining unit 1031 determines a flight altitude range corresponding to the traveling direction obtained by the traveling direction obtaining unit 101 from among a first plurality of flight altitude ranges. If the size of the unmanned aerial vehicle 11 is larger than the predetermined size, the altitude determining unit 1031 determines a flight altitude range corresponding to the traveling direction obtained by the traveling direction obtaining unit 101 from among a second plurality of flight altitude ranges that include flight altitudes higher than those in the first plurality of flight altitude ranges.

In this way, the unmanned aerial vehicle 11 flies low when the size thereof is small. Thus, the unmanned aerial vehicle 11 is insusceptible to wind and is able to fly efficiently.

Furthermore, the altitude determining unit 1031 may change a flight altitude range in accordance with the flight speed of the unmanned aerial vehicle 11. That is, if the flight speed of the unmanned aerial vehicle 11 is higher than a predetermined flight speed, the altitude determining unit 1031 determines a flight altitude range corresponding to the traveling direction obtained by the traveling direction obtaining unit 101 from among a first plurality of flight altitude ranges. If the flight speed of the unmanned aerial vehicle 11 is lower than or equal to the predetermined flight speed, the altitude determining unit 1031 determines a flight altitude range corresponding to the traveling direction obtained by the traveling direction obtaining unit 101 from among a second plurality of flight altitude ranges that include flight altitudes higher than those in the first plurality of flight altitude ranges.

In this way, the unmanned aerial vehicle 11 flies low when the flight speed thereof is high. Thus, the unmanned aerial vehicle 11 is insusceptible to wind and is able to fly efficiently.

The unmanned aerial vehicle 11 may obtain information about weather, such as a direction of wind or wind speed, at a current position of the unmanned aerial vehicle 11 from a server. In this case, the altitude determining unit 1031 may change a flight altitude range in accordance with a direction of wind or wind speed at a current position of the unmanned aerial vehicle 11. That is, if the wind speed at the current position of the unmanned aerial vehicle 11 is higher than a predetermined speed, the altitude determining unit 1031 determines a flight altitude range corresponding to the traveling direction obtained by the traveling direction obtaining unit 101 from among a first plurality of flight altitude ranges. If the wind speed at the current position of the unmanned aerial vehicle 11 is lower than or equal to the predetermined speed, the altitude determining unit 1031 determines a flight altitude range corresponding to the traveling direction obtained by the traveling direction obtaining unit 101 from among a second plurality of flight altitude ranges that include flight altitudes higher than those in the first plurality of flight altitude ranges.

In this way, the unmanned aerial vehicle 11 flies low when the wind speed at the current position thereof is high. Thus, the unmanned aerial vehicle 11 is insusceptible to wind and is able to fly efficiently.

The altitude determining unit 1031 may change a flight altitude range in accordance with whether or not the unmanned aerial vehicle 11 is transporting a load. The altitude determining unit 1031 determines whether or not the unmanned aerial vehicle 11 is transporting a load. The memory included in the unmanned aerial vehicle 11 may store a flag indicating whether or not the unmanned aerial vehicle 11 is transporting a load, and the altitude determining unit 1031 may determine whether or not the unmanned aerial vehicle 11 is transporting a load in accordance with the presence/absence of the flag. If the weight of the unmanned aerial vehicle 11 obtained by the weight obtaining unit 108 is lower than or equal to a predetermined weight, the altitude determining unit 1031 may determine that the unmanned aerial vehicle 11 is not transporting a load. If the weight of the unmanned aerial vehicle 11 is higher than the predetermined weight, the altitude determining unit 1031 may determine that the unmanned aerial vehicle 11 is transporting a load. If the unmanned aerial vehicle 11 is not transporting a load, the altitude determining unit 1031 determines a flight altitude range corresponding to the traveling direction obtained by the traveling direction obtaining unit 101 from among a first plurality of flight altitude ranges. If the unmanned aerial vehicle 11 is transporting a load, the altitude determining unit 1031 determines a flight altitude range corresponding to the traveling direction obtained by the traveling direction obtaining unit 101 from among a second plurality of flight altitude ranges that include flight altitudes higher than those in the first plurality of flight altitude ranges.

Third Embodiment

Next, a description will be given of an unmanned aerial vehicle according to a third embodiment of the present disclosure. If there is a tall structure such as a building around an unmanned aerial vehicle and if the unmanned aerial vehicle flies low, the chance of a collision between the unmanned aerial vehicle and the structure is increased. Accordingly, in the third embodiment, a flight altitude range is changed in accordance with the height of a structure around a current position of an unmanned aerial vehicle.

Figure 7:
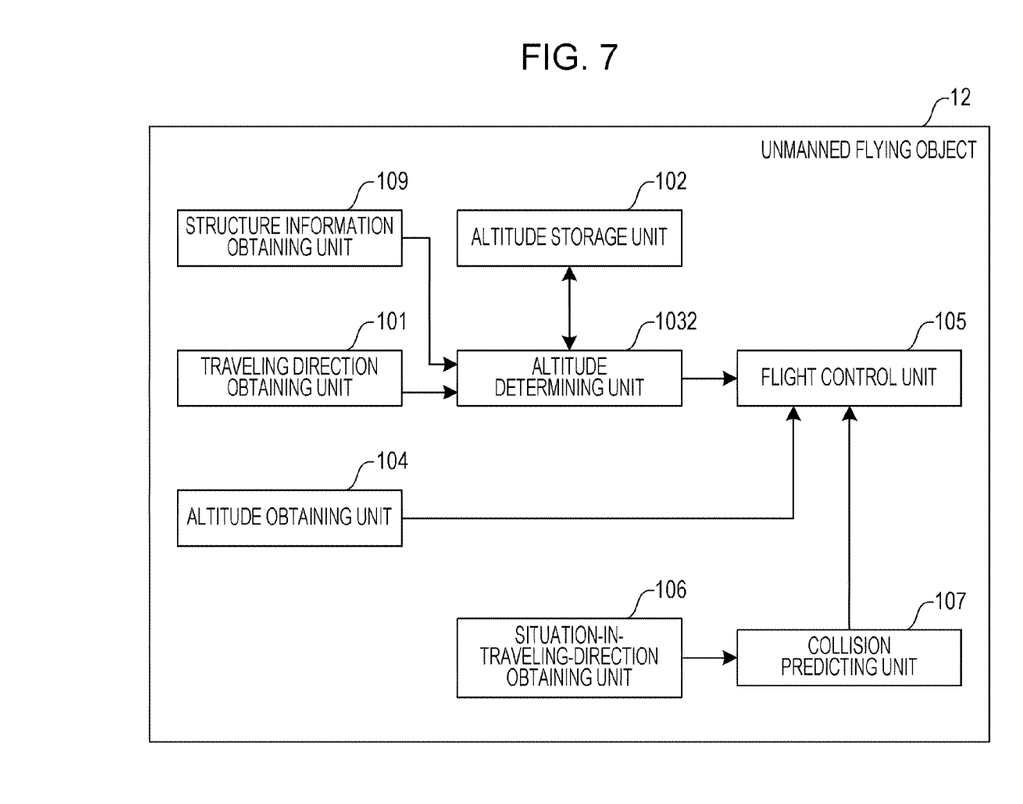
FIG. 7 is a diagram illustrating the configuration of an unmanned aerial vehicle according to a third embodiment of the present disclosure.

FIG. 7 is a diagram illustrating the configuration of an unmanned aerial vehicle according to the third embodiment of the present disclosure. The unmanned aerial vehicle 12 illustrated in FIG. 7 includes a traveling direction obtaining unit 101, an altitude storage unit 102, an altitude obtaining unit 104, a flight control unit 105, a situation-in-traveling-direction obtaining unit 106, a collision predicting unit 107, a structure information obtaining unit 109, and an altitude determining unit 1032. In the unmanned aerial vehicle 12 according to the third embodiment, the same components as those in the unmanned aerial vehicle 1 according to the first embodiment are denoted by the same reference numerals and the description thereof is omitted.

The structure information obtaining unit 109 obtains a height of a structure around a current position of the unmanned aerial vehicle 12. The structure information obtaining unit 109 may obtain a current position of the unmanned aerial vehicle 12 by using the GPS or the like and may obtain map information representing the surroundings of the unmanned aerial vehicle 12 on the basis of the obtained current position. The map information includes information about the heights of structures on the map.

The map information may be obtained from a server through a network or may be stored in the unmanned aerial vehicle 12 in advance. The surroundings of the unmanned aerial vehicle 12 include, for example, a circular region with a predetermined radius around the unmanned aerial vehicle 12. The structure information obtaining unit 109 may obtain a height of a structure that is present in the traveling direction of the unmanned aerial vehicle 12. Furthermore, the structure information obtaining unit 109 may obtain a height of a structure that is present on a flight route.

If the height of the structure obtained by the structure information obtaining unit 109 is lower than any of a first plurality of flight altitude ranges, the altitude determining unit 1032 determines a flight altitude range corresponding to the traveling direction obtained by the traveling direction obtaining unit 101 from among the first plurality of flight altitude ranges.

If the height of the structure obtained by the structure information obtaining unit 109 is higher than the lowest flight altitude range among the first plurality of flight altitude ranges and is lower than the lowest flight altitude range among a second plurality of flight altitude ranges, the altitude determining unit 1032 determines a flight altitude range corresponding to the traveling direction obtained by the traveling direction obtaining unit 101 from among the second plurality of flight altitude ranges that include flight altitudes higher than those in the first plurality of flight altitude ranges.

The first plurality of flight altitude ranges and the second plurality of flight altitude ranges according to the third embodiment are the same as the first plurality of flight altitude ranges 301 and the second plurality of flight altitude ranges 302 illustrated in FIG. 6.

That is, as illustrated in FIG. 6, if the height of a structure around a current position of the unmanned aerial vehicle 12 is lower than any of the first plurality of flight altitude ranges 301 and if the traveling direction is within an angle between the direction of northwest and the direction of northeast, the altitude determining unit 1032 determines the flight altitude range to be the first flight altitude range 201. If the height of a structure around a current position of the unmanned aerial vehicle 12 is lower than any of the first plurality of flight altitude ranges 301 and if the traveling direction is within an angle between the direction of northeast and the direction of southeast, the altitude determining unit 1032 determines the flight altitude range to be the second flight altitude range 202. If the height of a structure around a current position of the unmanned aerial vehicle 12 is lower than any of the first plurality of flight altitude ranges 301 and if the traveling direction is within an angle between the direction of southeast and the direction of southwest, the altitude determining unit 1032 determines the flight altitude range to be the third flight altitude range 203. If the height of a structure around a current position of the unmanned aerial vehicle 12 is lower than any of the first plurality of flight altitude ranges 301 and if the traveling direction is within an angle between the direction of southwest and the direction of northwest, the altitude determining unit 1032 determines the flight altitude range to be the fourth flight altitude range 204.

If the height of a structure around a current position of the unmanned aerial vehicle 12 is higher than the lowest flight altitude range among the first plurality of flight altitude ranges 301 and is lower than the lowest flight altitude range among the second plurality of flight altitude ranges 302 and if the traveling direction is within an angle between the direction of northwest and the direction of northeast, the altitude determining unit 1032 determines the flight altitude range to be the fifth flight altitude range 205. If the height of a structure around a current position of the unmanned aerial vehicle 12 is higher than the lowest flight altitude range among the first plurality of flight altitude ranges 301 and is lower than the lowest flight altitude range among the second plurality of flight altitude ranges 302 and if the traveling direction is within an angle between the direction of northeast and the direction of southeast, the altitude determining unit 1032 determines the flight altitude range to be the sixth flight altitude range 206.

If the height of a structure around a current position of the unmanned aerial vehicle 12 is higher than the lowest flight altitude range among the first plurality of flight altitude ranges 301 and is lower than the lowest flight altitude range among the second plurality of flight altitude ranges 302 and if the traveling direction is within an angle between the direction of southeast and the direction of southwest, the altitude determining unit 1032 determines the flight altitude range to be the seventh flight altitude range 207. If the height of a structure around a current position of the unmanned aerial vehicle 12 is higher than the lowest flight altitude range among the first plurality of flight altitude ranges 301 and is lower than the lowest flight altitude range among the second plurality of flight altitude ranges 302 and if the traveling direction is within an angle between the direction of southwest and the direction of northwest, the altitude determining unit 1032 determines the flight altitude range to be the eighth flight altitude range 208.

In this way, a flight altitude range is changed in accordance with a height of a structure around a current position of the unmanned aerial vehicle 12. Thus, the risk of collision with a structure is reduced and a safer flight is realized.

A flight control method and an unmanned aerial vehicle according to an embodiment of the present disclosure are capable of reducing the risk of collision between unmanned aerial vehicles and are useful as a flight control method for controlling flight of an unmanned aerial vehicle and an unmanned aerial vehicle.

What is claimed is:

1. A method for controlling an aerial vehicle, comprising:
determining a direction in which the aerial vehicle is traveling;
determining, with reference to a table, an altitude range which corresponds to the determined direction and within which the aerial vehicle is caused to fly, the table indicating correspondences between directions in which the aerial vehicle is traveling and altitude ranges within which the aerial vehicle is to fly;
obtaining, from an altimeter included in the aerial vehicle, a first altitude, which is a current altitude, at which the aerial vehicle is flying;
determining whether the first altitude is included in the determined altitude range; and
if the first altitude is not included in the determined altitude range, changing the current altitude at which the aerial vehicle is flying from the first altitude to a second altitude included in the determined altitude range.

2. The method according to claim 1, further comprising:
obtaining, from a Global Positioning System (GPS), position information representing a position of the aerial vehicle; and
determining, based on the position information, the direction in which the aerial vehicle is traveling.

3. The method according to claim 1, wherein the determining the direction in which the aerial vehicle is traveling includes obtaining a detection result from a magnetic sensor included in the aerial vehicle.

4. The method according to claim 1, wherein the determining the direction in which the aerial vehicle is traveling includes obtaining a detection result from a positioning sensor included in the aerial vehicle.

5. The method according to claim 1, wherein the table is stored in a memory included in the aerial vehicle.

6. The method according to claim 1, wherein the table is stored in a server connected to the aerial vehicle through a network.

7. The method according to claim 1, further comprising:
obtaining a detection result from a sensor included in the aerial vehicle, the detection result indicating whether an obstacle in the determined altitude range is present in front of the aerial vehicle that is traveling; and
if the detection result indicates that the obstacle is present, causing the aerial vehicle to fly in a direction to avoid collision with the obstacle within the determined altitude range.

8. The method according to claim 7, wherein the sensor includes any one of a laser sensor, an ultrasonic sensor, and a camera.

9. The method according to claim 1, wherein the determined altitude range is from a third altitude to a fourth altitude higher than the third altitude,
the method further comprising:
obtaining a detection result from a sensor included in the aerial vehicle, the detection result indicating whether an obstacle in the determined altitude range is present in front of the aerial vehicle that is traveling; and
if the detection result indicates that an obstacle is present within a range from a fifth altitude to a sixth altitude higher than the fifth altitude, changing the altitude at which the aerial vehicle is caused to fly to a seventh altitude included in a range from the third altitude to the fifth altitude or a range from the sixth altitude to the fourth altitude.

10. The method according to claim 9, wherein the sensor includes any one of a laser sensor, an ultrasonic sensor, and a camera.

11. The method according to claim 1, further comprising:
obtaining a detection result from a sensor included in the aerial vehicle, the detection result indicating whether an obstacle in the determined altitude range is present in front of the aerial vehicle that is traveling; and
causing the aerial vehicle to fly along a route different from a route along which the aerial vehicle is traveling, with an altitude of the aerial vehicle being maintained, at least until the aerial vehicle has passed the obstacle, the obstacle not being present on the different route.

12. The method according to claim 11, wherein the sensor includes any one of a laser sensor, an ultrasonic sensor, and a camera.

13. The method according to claim 1, wherein
the table indicates a correspondence between a first direction and a first altitude range, a correspondence between a second direction and a second altitude range, a correspondence between a third direction and a third altitude range, and a correspondence between a fourth direction and a fourth altitude range,
the first direction indicates a direction included in a continuous direction range from northwest to northeast, north being included in the first direction,
the second direction indicates a direction included in a continuous direction range from northeast to southeast, east being included in the second direction,
the third direction indicates a direction included in a continuous direction range from southeast to southwest, south being included in the third direction,
the fourth direction indicates a direction included in a continuous direction range from southwest to northwest, west being included in the fourth direction, and
the first altitude range, the second altitude range, the third altitude range, and the fourth altitude range are different from one another.

14. The method according to claim 1, wherein the altitude ranges indicated in the table include a first altitude range and a second altitude range higher than the first altitude range, the method further comprising:
obtaining weight information of the aerial vehicle from a memory included in the aerial vehicle;
if, based on the weight information, a weight of the aerial vehicle is lower than or equal to a predetermined value, determining, from the first altitude range, the altitude range within which the aerial vehicle is caused to fly; and
if, based on the weight information, the weight of the aerial vehicle is higher than the predetermined value, determining, from the second altitude range, the altitude range within which the aerial vehicle is caused to fly.

15. The method according to claim 1, wherein the altitude ranges indicated in the table include a first altitude range and a second altitude range higher than the first altitude range, the method further comprising:
if the aerial vehicle is not transporting a load, determining, from the first altitude range, the altitude range within which the aerial vehicle is caused to fly; and
if the aerial vehicle is transporting a load, determining, from the second altitude range, the altitude range within which the aerial vehicle is caused to fly.

16. The method according to claim 1, wherein the altitude ranges indicated in the table include a first altitude range and a second altitude range higher than the first altitude range, the method further comprising:

obtaining, from a Global Positioning System (GPS), position information representing a position of the aerial vehicle;

obtaining, based on the obtained position information, map information including a position of the aerial vehicle, the map information including information representing positions and heights of structures that are present around the position of the aerial vehicle;

if a building within a predetermined range from the position of the aerial vehicle has a height lower than the first altitude range, determining, from the first altitude range, the altitude range within which the aerial vehicle is caused to fly; and if the building within the predetermined range from the position of the aerial vehicle has a height higher than the first altitude range and lower than the second altitude range, determining, from the second altitude range, the altitude range within which the aerial vehicle is caused to fly.

17. The method according to claim 1, wherein the direction in which the aerial vehicle is traveling is determined from among directions including north, east, south, and west.

18. The method according to claim 1, wherein for each of the directions from which the direction in which the aerial vehicle is traveling is determined, the table includes at least two altitude ranges within which the aerial vehicle is to fly, and the determined altitude range within which the aerial vehicle is to fly is selected from among the at least two altitude ranges based on whether a predetermined condition is satisfied.

19. The method according to claim 18, wherein, whether the predetermined condition is satisfied, is determined using information about weather at a current position of the aerial vehicle.

20. An aerial vehicle that flies in an unmanned manner, the aerial vehicle comprising:

a processor; and a memory, wherein the processor determines a direction in which the aerial vehicle is traveling, determines, with reference to a table stored in the memory, an altitude range which corresponds to the determined direction and within which the aerial vehicle is caused to fly, the table indicating correspondences between directions in which the aerial vehicle is traveling and altitude ranges within which the aerial vehicle is to fly, obtains, from an altimeter included in the aerial vehicle, a first altitude, which is a current altitude, at which the aerial vehicle is flying, determines whether the first altitude is included in the determined altitude range, and if the first altitude is not included in the determined altitude range, changes the current altitude at which the aerial vehicle is flying from the first altitude to a second altitude included in the determined altitude range.

* * * * *